United States Patent
Duffy et al.

(10) Patent No.: US 11,401,193 B2
(45) Date of Patent: Aug. 2, 2022

(54) GLASS-CERAMIC ARTICLES WITH IMPROVED STRESS PROFILES

(71) Applicant: CORNING INCORPORATED, Corning, NY (US)

(72) Inventors: Delena Lucinda Justice Duffy, Lindley, NY (US); Constance L Fieno, Millport, NY (US); Jill Marie Hall, Elmira, NY (US); Yuhui Jin, Painted Post, NY (US); Vitor Marino Schneider, Painted Post, NY (US)

(73) Assignee: Corning Incorporated, Corning, NY (US)

(*) Notice: Subject to any disclaimer, the term of this patent is extended or adjusted under 35 U.S.C. 154(b) by 161 days.

(21) Appl. No.: 16/545,162

(22) Filed: Aug. 20, 2019

(65) Prior Publication Data

US 2020/0055764 A1 Feb. 20, 2020

Related U.S. Application Data

(60) Provisional application No. 62/719,730, filed on Aug. 20, 2018.

(51) Int. Cl.
*C03C 10/00* (2006.01)
*C03B 32/02* (2006.01)
*C03C 21/00* (2006.01)

(52) U.S. Cl.
CPC .......... *C03B 32/02* (2013.01); *C03C 10/0027* (2013.01); *C03C 21/002* (2013.01)

(58) Field of Classification Search
None
See application file for complete search history.

(56) References Cited

U.S. PATENT DOCUMENTS

| 8,854,623 B2 | 10/2014 | Fontaine et al. |
| 9,140,543 B1 | 9/2015 | Allan et al. |

(Continued)

FOREIGN PATENT DOCUMENTS

| CN | 205120285 U | 3/2016 |
| CN | 107001120 A | 8/2017 |

(Continued)

OTHER PUBLICATIONS

International Search Report and Written Opinion of the European International Searching Authority; PCT/US2019/046450; dated Nov. 14, 2019; 11 Pgs.
TW108129417 Search Report dated Apr. 30, 2020; 1 Page; Taiwan Patent Office.

(Continued)

*Primary Examiner* — David Sample
(74) *Attorney, Agent, or Firm* — Jeffrey A. Schmidt

(57) ABSTRACT

Glass-ceramic articles are manufactured by an ion exchange process that results in glass-based articles having improved stress profiles. A knee may be located at a depth of 3 microns or deeper. A compressive stress at a surface may be 200 MPa or more and at a knee may be 20 MPa or more. A non-sodium oxide may have a non-zero concentration that varies from the first surface to a depth and a depth of compression (DOC) may be located at 0.10·t, or even at 0.17·t or deeper. A two-step ion exchange (DIOX) includes, for example, a potassium bath in a first treatment to form a spike in a spike region of the stress profile, followed by a second treatment which includes, for example, a potassium and sodium mixed bath to maintain the spike and form a tail region of the stress profile. The glass-ceramic articles may thereby avoid developing a vitreous surface layer, which facilitates repeatable and reliable measurement of waveguide modes and determination of compressive stress in the surface (CS) and depth of the spike.

11 Claims, 10 Drawing Sheets

(56) References Cited

U.S. PATENT DOCUMENTS

| | | | |
|---|---|---|---|
| 9,809,488 B2 | 11/2017 | Beall et al. | |
| 2015/0099124 A1* | 4/2015 | Beunet | C03C 10/0027 |
| | | | 428/410 |
| 2015/0329413 A1* | 11/2015 | Beall | C03B 32/02 |
| | | | 501/32 |
| 2016/0102010 A1* | 4/2016 | Beall | C03C 21/002 |
| | | | 428/410 |
| 2017/0295657 A1* | 10/2017 | Gross | H05K 5/0017 |
| 2018/0105453 A1 | 4/2018 | Beall et al. | |
| 2018/0105461 A1 | 4/2018 | Schneider | |
| 2019/0177210 A1 | 6/2019 | Beall et al. | |
| 2019/0300426 A1* | 10/2019 | Fu | C03C 21/002 |
| 2019/0389764 A1 | 12/2019 | Andrews et al. | |
| 2020/0239354 A1* | 7/2020 | Li | C03C 3/097 |

FOREIGN PATENT DOCUMENTS

| | | |
|---|---|---|
| CN | 108290781 A | 7/2018 |
| CN | 111954646 A | 11/2020 |
| JP | 2016024002 A | 2/2016 |
| TW | 201602029 A | 1/2016 |
| TW | 201815715 A | 5/2018 |
| TW | 201827364 A | 8/2018 |
| TW | 201829337 A | 8/2018 |
| WO | 2017/184803 A1 | 10/2017 |
| WO | 2018143991 A1 | 8/2018 |
| WO | 2019191358 A1 | 10/2019 |

OTHER PUBLICATIONS

Chinese Patent Application No. 201980054808.9, Office Action, dated May 7, 2022, 12 pages, Chinese Patent Office.

* cited by examiner

GLASS-CERAMIC ARTICLES WITH IMPROVED STRESS PROFILES

CROSS-REFERENCE TO RELATED APPLICATION

This application claims the benefit of priority under 35 U.S.C. § 119 of U.S. Provisional Application Ser. No. 62/719730 filed on Aug. 20, 2018, the content of which is relied upon and incorporated herein by reference in its entirety.

FIELD

Embodiments of the disclosure generally relate to glass-ceramic articles and, to high strength glass-ceramic articles having improved stress profiles and methods for manufacturing the same.

BACKGROUND

Glass-ceramic articles can be chemically strengthened, for example through ion exchange, to improve the mechanical properties such as resistance to crack penetration and drop performance. The ion exchange process in glass-ceramics, which are multiphase materials with one or more crystalline phases and a residual glass phase, can be complex. Ion exchange can affect one or more of the crystalline phases in addition to the residual glass phase.

Chemical treatment is a strengthening method to impart a desired/engineered stress profile having one or more of the following parameters: compressive stress (CS), depth of compression (DOC), and maximum central tension (CT). Many glass-ceramic articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass-ceramics is a methodology in this field.

Usually in lithium (Li)-based substrates, two ions, sodium (Na) and potassium (K), are used for diffusion and formation of the stress profile. During such IOX, K, Na, and Li are all diffusing and exchanging simultaneously. Generally, K being an ion with larger ionic radius induces higher stress but is slow to diffuse in comparison the smaller ionic radius Na ion that induces lower stress. For that reason, inducing high stress at moderate depths can be challenging when using a mixed K/Na salt bath. The K ions define what is called the spike of the profile and the Na ions the deep tail of the profile.

There is an on-going need provide glass-ceramic articles that are strengthened to reliable mechanical and/or chemical properties for their application. There is a specific need to strengthen glass-ceramic articles containing lithium with potassium, which exhibit improved mechanical and/or chemical reliability for their industry. There is also an ongoing need to do so in efficient and cost-effective ways.

SUMMARY

Aspects of the disclosure pertain to glass-ceramic articles and methods for their manufacture and use.

In an aspect 1, a glass-ceramic article comprises: a glass-ceramic substrate having opposing first and second surfaces defining a substrate thickness (t); a central composition at a center of the glass-ceramic article containing an alkali metal and a crystalline phase, wherein the crystalline phase is 20% or more by weight of the central composition; and a stress profile comprising: a knee that is at a depth of 3 micrometers or more.

In an aspect 2, a glass-ceramic article comprises: a glass-ceramic substrate having opposing first and second surfaces defining a substrate thickness (t); a central composition at a center of the glass-ceramic article containing an alkali metal and a crystalline phase, wherein the crystalline phase is 20% or more by weight of the central composition; and a stress profile comprising: a first compressive stress at the first surface that is 200 MPa or more; and a second compressive stress at a knee that is 20 MPa or more.

In an aspect 3, a glass-ceramic article comprises: a glass-ceramic substrate having opposing first and second surfaces defining a substrate thickness (t); a central composition at a center of the glass-ceramic article containing an alkali metal and a crystalline phase, wherein the crystalline phase is 20% or more by weight of the central composition; a non-sodium oxide having a non-zero concentration that varies from the first surface to a depth of layer of the non-sodium oxide; and a stress profile comprising a knee and a depth of compression (DOC) that is located at 0.10·t or deeper.

An aspect 4 according to any preceding aspect, wherein the alkali metal of the central composition is lithium.

An aspect 5 according to any preceding aspect, wherein the crystalline phase is present in an amount of from 20% to about 70% by weight of the central composition.

An aspect 6 according to any preceding aspect, wherein a surface concentration of the crystalline phase at the first and second surfaces is within about 1% of the crystalline phase in the central composition.

An aspect 7 according to any preceding aspect, wherein a vitreous surface layer is absent.

An aspect 8 according to any preceding aspect, wherein the crystalline phase comprises a petalite crystalline phase and/or a lithium silicate crystalline phase.

An aspect 9 according to any preceding aspect, wherein the lithium silicate crystalline phase is a lithium disilicate crystalline phase.

An aspect 10 according to any preceding aspect, wherein the glass-ceramic substrate comprises lithium-containing aluminosilicate glass-ceramic with a β-spodumene solid solution crystalline phase.

An aspect 11 according to any preceding aspect, wherein the central composition comprises by weight: 55 to 80% $SiO_2$, 2 to 20% $Al_2O_3$, 0.5 to 6% $P_2O_5$, 5 to 20% $Li_2O$, 0 to 5% $Na_2O$, 0.2 to 15% $ZrO_2$, 0 to 10 $B_2O_3$; and 0 to 10% ZnO.

An aspect 12 according to any preceding aspect, wherein the stress profile comprises: a spike region extending from the first surface to the knee; and a tail region extending from the knee to the center of the glass-ceramic article; wherein all points of the stress profile located in the spike region comprise a tangent having a value that is 20 MPa/micrometer or greater, and all points of the stress profile located in the tail region comprise a tangent having a value that is 2 MPa/micrometer or less.

An aspect 13 according to any preceding aspect, wherein the knee comprises a compressive stress of 50 MPa or more.

An aspect 14 according to any preceding aspect, comprising a first metal oxide having a non-zero concentration that varies from the first surface to a depth of layer (DOL) with respect to the first metal oxide.

An aspect 15 according to any preceding aspect, wherein the first metal oxide is selected from the group consisting of: potassium (K), rubidium (Rb), cesium (Cs), francium (Fr), silver (Ag), gold (Au), and copper (Cu).

An aspect 16 according to aspect 14 or 15, wherein the first metal oxide is potassium.

An aspect 17 according to any preceding aspect, wherein lithium is present at the first and/or second surfaces in a non-zero concentration.

An aspect 18 according to any preceding aspect, wherein t is in the range of from 50 micrometers to 5 millimeters.

In an aspect 19, a glass-ceramic article comprises: a glass-ceramic substrate having opposing first and second surfaces defining a substrate thickness (t) and a central composition at a center of the glass-ceramic article containing lithium and a crystalline phase, wherein the crystalline phase is 20% or more by weight of the central composition; potassium oxide having a non-zero concentration that varies from the first and/or second surfaces to a depth of layer (DOL) of the potassium oxide; a stress profile comprising: a depth of compression (DOC) that is greater than or equal to about 0.17*t; a first compressive stress at the first surface that is 200 MPa or more; a second compressive stress at a knee that is 20 MPa or more; and a spike region extending from the first surface to the knee, wherein the knee is at a depth of 5 micrometers or more.

An aspect 20 according to aspect 19, wherein the glass-ceramic substrate comprises lithium-containing aluminosilicate glass-ceramic with a β-spodumene solid solution crystalline phase.

An aspect 21 according to aspect 19, wherein the crystalline phase comprises a petalite crystalline phase and/or a lithium silicate crystalline phase.

An aspect 22 according to any of aspects 19-21, wherein the central composition comprises by weight: 55 to 80% $SiO_2$, 2 to 20% $Al_2O_3$, 0.5 to 6% $P_2O_5$, 5 to 20% $Li_2O$, 0 to 5% $Na_2O$, 0.2 to 15% $ZrO_2$, 0 to 10 $B_2O_3$; and 0 to 10% ZnO.

An aspect 23 according to any of aspects 19-22, wherein a value of color parameter a* in accordance with CIELAB color coordinate system measured after a wash treatment is within 0.05 units of the color parameter a* prior to exposure to the wash treatment, wherein the wash treatment comprises exposing the glass-ceramic article to a wash solution having a pH from 2 to 12 for 30 minutes.

An aspect 24 according to any of aspects 19-23, wherein a value of color parameter b* in accordance with CIELAB color coordinate system measured after a wash treatment is within 0.5 units of the color parameter b* prior to exposure to the wash treatment, wherein the wash treatment comprises exposing the glass-ceramic article to a wash solution having a pH from 2 to 12 for 30 minutes.

An aspect 25 according to any of aspects 19-24, wherein a value of color parameter L* in accordance with CIELAB color coordinate system measured after a wash treatment is within 1 unit of the color parameter L* prior to exposure to the wash treatment, wherein the wash treatment comprises exposing the glass-ceramic article to a wash solution having a pH from 2 to 12 for 30 minutes.

An aspect 26 according to any of aspects 19-25, wherein a surface concentration of the crystalline phase at the first and second surfaces is within about 1% of the crystalline phase in the central composition.

An aspect 27 according to any of aspects 19-26, wherein a vitreous surface layer is absent.

An aspect 28 according to any of aspects 19-27, wherein a surface waveguide is present from the first and/or second surface to the DOL.

An aspect 29 according to any of aspects 19-28, wherein t is in the range of from 50 micrometers to 5 millimeters.

In an aspect 30, a consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises the glass-ceramic article of any preceding aspect.

In an aspect 31, a method of manufacturing a glass-ceramic article comprises: exposing a glass-ceramic substrate that contains lithium and a crystalline phase in a base composition, the glass-ceramic substrate having opposing first and second surfaces defining a substrate thickness (t), to ion exchange treatments to form the glass-ceramic article, wherein the ion exchange treatments comprise: a first ion exchange treatment including: a first bath comprising first metal ions having an atomic radius that is greater than the atomic radius of lithium; and a second ion exchange treatment performed after the first ion exchange treatment including a second bath comprising the first metal ions and second metal ions; wherein the first metal ions of the first bath are present in a percentage amount that is higher than the first ions in the second bath.

An aspect 32 according to aspect 31, wherein the glass-ceramic substrate comprises lithium-containing aluminosilicate glass-ceramic having a β-spodumene solid solution crystalline phase.

An aspect 33 according to aspect 31, wherein the crystalline phase comprises a petalite crystalline phase and/or a lithium silicate crystalline phase An aspect 34 according to any of aspects 31-33, wherein the first bath comprises the first metal ions in amount of 97 weight % or higher in the first bath, and the second bath comprises the first metal ions in an amount of between about 80% percent and less than 97 weight %.

An aspect 35 according to any of aspects 31-34, wherein the first metal ions comprise potassium, the first bath comprises potassium nitrate ($KNO_3$) in amount in the range of 97 weight % to 100 weight %, and the second bath comprises potassium nitrate ($KNO_3$) in an amount of between about 80 weight % and less than 97 weight % and sodium nitrate ($NaO_3$) in an amount of between 3 weight % and 20 weight %.

An aspect 36 according to any of aspects 31-35, wherein the glass-ceramic article has a stress profile comprising a depth of compression (DOC) that is located at 0.17·t or deeper.

An aspect 37 according to any of aspects 31-36, wherein the first metal ions have a first non-zero concentration that varies from the first surface to a depth of layer (DOL) with respect to the first metal ions.

An aspect 38 according to aspect 37, wherein the first metal ions are selected from the group consisting of: potassium (K), rubidium (Rb), cesium (Cs), francium (Fr), silver (Ag), gold (Au), and copper (Cu).

An aspect 39 according to any of aspects 31-38, wherein the first ion exchange treatment and/or the second ion exchange treatment further comprise a dosage of a lithium salt added to the first bath and/or the second bath.

An aspect 40 according to aspect 39, wherein the lithium salt comprises lithium nitrate (LiNO₃) in a dosage amount in the range of 0.1 to 1 wt. % of the amount of the first bath and/or the second bath.

An aspect 41 according to any of aspects 39 or 40, wherein a surface concentration of the crystalline phase at the first and second surfaces is within about 1% of the crystalline phase in the base composition.

An aspect 42 according to any of aspects 31-41, wherein the first ion exchange treatment, the second ion exchange treatment, or both further comprise a dosage of sodium nitrite (NaNO₂) in an amount in the range of 0.1 to 1 wt. % of the amount of the first bath and/or the second bath.

An aspect 43 according to any of aspects 31-42, wherein the first ion exchange treatment, the second ion exchange treatment, or both further comprise a dosage of tri-sodium phosphate (TSP) in an amount in the range of 0.1 to 1 wt. % of the amount of the first bath and/or the second bath.

An aspect 44 according to any of aspects 31-43, wherein tis in the range of from 50 micrometers to 5 millimeters

BRIEF DESCRIPTION OF THE DRAWINGS

The accompanying figures, which are incorporated in and constitute a part of this specification, illustrate several embodiments described below.

DETAILED DESCRIPTION

Figure 1A:
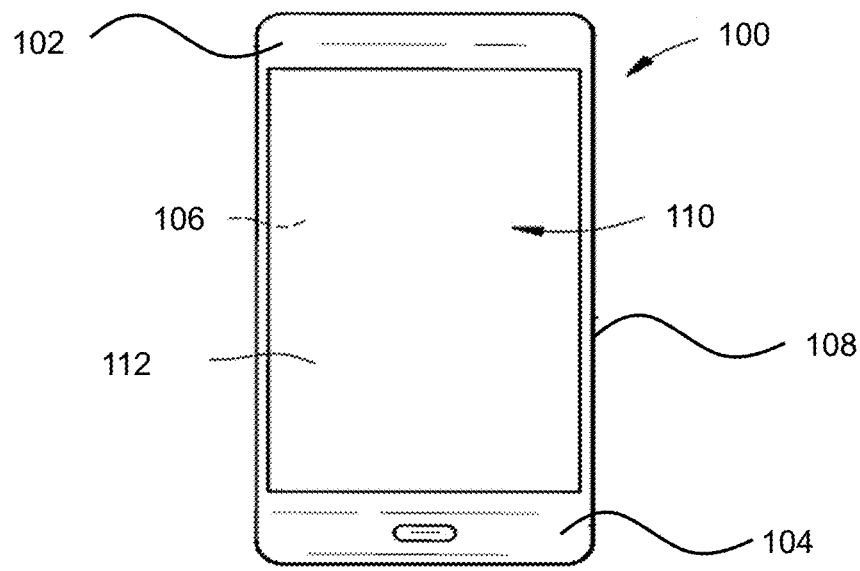
FIG. 1A is a plan view of an exemplary electronic device incorporating any of the glass-based articles disclosed herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Definitions and Measurement Techniques

As used herein, the term "glass-ceramic" are solids prepared by controlled crystallization of a precursor glass and have one or more crystalline phases and a residual glass phase.

As used herein, a "vitreous" region or layer refers to a surface region with a lower percentage of crystals than an inner region. The vitreous region or layer can be formed through (i) the decrystallization of one or more crystalline phases of a glass-ceramic article during ion exchange, (ii) the lamination or fusing of a glass to a glass-ceramic, or (iii) other means known in the art such as formation while ceramming a precursor glass into a glass-ceramic.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant, such as amounts less than 0.01 mol %.

Unless otherwise specified, all compositions described herein are expressed in terms of weight percent (wt %) on an oxide basis.

A "stress profile" is stress with respect to position of a glass-based article or any portion thereof. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-ceramic article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress or, in some situations where the tensile stress is specifically identified, as an absolute value. Central tension (CT) refers to tensile stress in a central region or central tension region of the glass-based article. Maximum central tension (maximum CT or $CT_{max}$) occurs in the central tension region, and often is located at 0.5·t, where t is the article thickness. Reference to "nominally" at 0.5·t allows for variation from exact center of the location of the maximum tensile stress.

A "knee" of a stress profile is a depth of an article where the slope of the stress profile transitions from steep to gradual. The knee may refer to a transition area over a span of depths where the slope is changing. The depth of the knee is measured as the depth of layer of the largest ion having a concentration gradient in the article. The CS of the knee is the CS at the depth of the knee.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-ceramic article (i.e., the distance from a surface of the glass-ceramic article to its interior region) at which an ion of a metal oxide or alkali metal oxide (e.g., the metal ion or alkali metal ion) diffuses into the glass-ceramic article where the concentration of the ion reaches a minimum value, as measured by a surface stress meter (FSM) using commercially available instruments such as the FSM-6000, manufactured by Orihara Industrial Co., Ltd. (Japan). In some embodiments, the DOL is given as the depth of exchange of the slowest-diffusing or largest ion introduced by an ion exchange (IOX) process.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

Unless otherwise specified, CT and CS are expressed herein in megaPascals (MPa), whereas thickness and DOC are expressed in millimeters or microns (micrometers).

The DOC and maximum central tension (CT) values are measured using a scattered light polariscope (SCALP) model number SCALP-04 available from GlasStress Ltd., located in Tallinn, Estonia.

The surface CS measurement method depends on whether or not a vitreous region or layer is formed at the surface of the glass-ceramic article during ion exchange. If there is no vitreous layer or region, then the surface CS is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. If a vitreous region or layer is formed, then the surface CS (and the CS of the vitreous layer or region) is measured by the birefringence of the first transmission (coupling) resonance of the vitreous region in a prism coupling measurement and measures the depth of layer of the vitreous region by the spacing between the first and second transmission resonances or the breadth of the first transmission resonance.

The CS in the remainder of the CS region is measured by the refracted near-field (RNF) method described in U.S. Pat. No. 8,854,623, entitled "Systems and methods for measuring a profile characteristic of a glass sample", which is hereby incorporated by reference in its entirety. The RNF measurement is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The stress profile may be measured with a combination of RNF for the inner CS, SCALP for the CT region, and the method used for measuring the surface CS.

CIELAB color space coordinates (e.g., CIE L*; CIE a*; and CIE b*; or CIE L*, a*, and b*; or L*, a*, and b*) for describing the color of glass-ceramics articles according to aspects and/or embodiments of this disclosure were determined using an x-rite color i7 spectrophotometer to measure the transmission and total reflectance (specular included) with illuminants D65, A, and F2 with a 10° observer and then computes the L*; a*; and b* color space coordinates via the CIELAB standard.

Double Ion Exchange (DIOX) Treatment

Disclosed herein are glass-ceramic articles having improved stress profiles. The articles are prepared using a modified two-step ion exchange (DIOX) for diffusion that: (1) first introduces a spike in a spike region of the stress profile, e.g., by use of a bath in a first treatment, the bath including first metal ions whose atomic radius is greater than that of lithium, for example potassium, followed by (2) a second treatment of diffusion to maintain the spike and form a tail region of the stress profile, e.g., by use of the first metal ion of the first bath and second metal ions, for example, a potassium- and sodium-mixed bath. Methods herein result in stress profiles that are stable and controllable in materials such as glass-ceramics that may contain lithium disilicate in crystalline form as one of its components.

In some embodiments, the first step of the DIOX creates a significant spike region in the surface of the glass plus a decaying tail of the stress profile towards the center of the article. The spike of stress/potassium at and below the surface forms a waveguide, which facilitates repeatable and reliable measurement of waveguide modes and determination of compressive stress in the surface (CS) and depth of the spike. The second step forms the tail region of the stress profile without disrupting the spike region. The methods herein are in an opposite order compared to prior art DIOX treatments for forming glass-ceramic articles, which typically rely on a first step to create a stress profile within the substrate using, for example, a bath of: 50 wt % $KNO_3$/50 wt % $NaNO_3$ (380° C. for 4 hours) followed by a second step to impart a spike in the surface using, for example, a bath of: 90 wt % $KNO_3$/10 wt % $NaNO_3$ (20 minutes).

In glass-ceramic substrates containing lithium and crystalline phases, for example, petalite crystalline and/or lithium silicate crystalline phases, diffusion of potassium is significantly slower than diffusion of sodium due not only to differing ionic radii but also due to the presence of crystalline material in the substrate. That means that to create a spike in the near surface a very large diffusion time generally is needed. Moreover, in some particular cases of glass-ceramics, there is a phenomenon that occurs when sodium diffuses into this material. As sodium diffuses into the material, part of the sodium exchanges with the lithium available in the substrate, but another part exchanges with the lithium-based nanocrystals in the glass-ceramic structure, for example lithium disilicate ($Li_2Si_2O_5$ and other forms of it). The net result is that the nanocrystals are partially dissolved, which generate the appearance of a vitreous Na-doped silicate glass layer. Due to the kinetics of the diffusion process this vitreous layer appears in the surface of the material being ion-exchanged, decreasing gradually on its amorphous content towards the center of the article. The thickness of this vitreous layer will depend on the amount of sodium, time and temperature used in the diffusion process.

In practical terms, one can achieve vitreous layers rich in Na by Na ion-exchange in these glass ceramics from the order of a few nanometers to tens of microns (for example, in the range from hundreds of nanometers up to 4 micrometers in thickness). This vitreous layer being lower in index than the underlying glass-ceramic substrate frustrates light coupling via a prism used in metrology of stress via a FSM-6000 LE instrument. As a result, fringes get blurred and/or corrupt making it difficult if not impossible to measure the stress at the surface accurately without modifying the metrology technique/equipment. Embodiments of the present disclosure can tolerate some amount of blurring at the surface resulting from the presence of a Na rich layer (not considered a vitreous layer) that is a minimal thickness that still permits the fringes to be detected and measured. Thus, in some embodiments, the glass-ceramic articles disclosed herein do not have a vitreous layer.

In some embodiments, to avoid the formation of a vitreous layer, the DIOX treatment disclosed herein may be further enhanced by the addition of a small percentage of Li to the bath of one or both steps, which offsets any initial pure bath condition. That is, by adding a small percentage of Li to begin to create a nominal lithium "poisoning" or "dosage" rather than waiting for diffusion of Li from the underlying substrate, formation of a vitreous layer, which is detrimental to process control, is mitigated or avoided. The resulting in-process and final samples are more uniform than otherwise, which facilitates consistent metrology conditions and process control (e.g., of the bath composition, the temperature of the bath, and the duration of the ion exchange treatments). That is, stress is measurable for the first batch of glass being ion-exchanged. In some embodiments, the Li may be introduced in the form of a lithium-containing salt, including, but not limited to $LiNO_3$ and $LiNO_2$.

In addition, the DIOX treatment may be further enhanced by introducing some $NaNO_2$ to the ion exchange bath. This is to generate better homogeneity of the salt mix and to reduce the amount of impurities (such as magnesium ions) that are part of residual salts via decomposition.

The overall procedure herein is conducted inversely to the common procedure to generate stresses in glass and glass-ceramic via a two-step ion exchange.

In some embodiments, the first IOX treatment herein involves creation of a spike in the article in question (e.g. lithium-containing aluminosilicate glass-ceramics) using a bath that is 100 wt % $KNO_3$ or as close to 100% of ions larger than Li, and optionally larger than Na. In some embodiments, the bath for the first ion exchange treatment includes $NaNO_2$ and a lithium-containing salt such as $LiNO_3$ or $LiNO_2$ to avoid the formation of a vitreous layer and to improve the bath chemistry. In this case, the diffusion is long and creates a reasonable spike. Other elements in the first IOX treatment could be used instead of, or in conjunction with, potassium, such as rubidium, cesium, francium, copper, silver, gold, etc. to enhance the stress values. In one or more embodiments, the metal ions of the first bath are larger than lithium. In some embodiments, the metal ions of the first bath are larger than sodium. In some embodiments, the metal ions of the first bath are potassium.

In some embodiments, the second IOX treatment herein involves creation of a tail of the stress profile with a bath where the ions larger than Li and optionally larger than Na is not 100%. In one or more embodiments, the ratio is 90 wt % $KNO_3$ and 10 wt % $NaNO_3$, which is opposite to the usual process. This leads to the creation of a significant amount of stress in the deep region of the profile (tail of the profile) due to the exchange of Na with Li. In addition, a small reduction of stress in the surface is experienced but also a continuous increase of the spike depth is also observed. This increase in the spike depth allows the formation of more fringes or more spaced fringes for detection and metrology via the FSM-6000LE instrument. Also in some embodiments in the second step the bath for the second ion exchange treatment includes $NaNO_2$ and a lithium-containing salt such as $LiNO_3$ or $LiNO_2$ to mitigate or avoid formation of a vitreous layer and improve bath chemistry similarly to the first step.

In one or more embodiments, the amount of lithium-containing salt, such as $LiNO_3$ or $LiNO_2$ in the first bath and/or the second bath is in the range of 0.1 to 1 wt. % or 0.2 to 0.5 wt. % of the amount of the first bath and/or the second bath.

In one or more embodiments, the amount of $NaNO_2$ in the first bath and/or the second bath is in the range of 0.1 to 1 wt. % or 0.2 to 0.5 wt. % of the amount of the first bath and/or the second bath.

Other ratios of salt concentration in the second ion exchange treatment are also possible such as 80 wt % $KNO_3$ and 20 wt % $NaNO_3$. As the potassium amount is decreased in the second step, a small depression in index may occur and make the stress measurements more difficult. In addition, the stress at the surface will also decrease proportionally.

In the glass-ceramic articles, there is a metal oxide other than lithium (e.g., K, Rb, Cs, Ag, etc. . . . ), not present in a glass-ceramic substrate's base composition, having a non-zero concentration that varies from the first surface to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the metal oxide is non-zero and varies, along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from the point to the second surface.

In some embodiments, the concentration of more than one metal oxide (e.g., a combination of $Na_2O$ and $K_2O$) may vary from the first surface to a depth of layer (DOL) with respect to the metal oxide. In some embodiments, where concentration of two metal oxide vary and where the radius of the ions differs from one or another, the concentration of ions having a larger radius is greater than the concentration of ions having a smaller radius at shallow depths, while at deeper depths, the concentration of ions having a smaller radius is greater than the concentration of ions having larger radius. This is due, in part, to the size of the monovalent ions that are exchanged into the glass-ceramic for smaller monovalent ions. In such glass-ceramic articles, the area at or near the surface comprises a greater CS due to the greater amount of larger ions (i.e., K+ ions) at or near the surface. Furthermore, the slope of the stress profile typically decreases with distance from the surface due to the nature of the concentration profile achieved due to chemical diffusion from a fixed surface concentration.

In one or more embodiments, the metal oxide concentration gradient extends through a substantial portion of the thickness t of the article. In some embodiments, the concentration of the metal oxide may be about 0.5 mol % or greater (e.g., about 1 mol % or greater) along the entire thickness of the gradient, and is greatest at a first surface and/or a second surface (0·t) and decreases substantially constantly to a point between the first and second surfaces. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the metal oxide may be determined from a baseline amount of the metal oxide in the glass-ceramic substrate ion exchanged to form the glass-ceramic article.

General Overview of Properties of Glass-Ceramic Articles

The stress profiles achieved by the methods disclosed herein are unique. Stress profiles may comprise: a spike region extending from the first surface to a knee and a tail region extending from the knee to a center of the glass-ceramic article.

Glass-ceramic articles disclosed herein are advantageous in that they have excellent strength and color consistency. The DIOX treatment enables measurements of stress in glass-ceramic samples during manufacture that would otherwise be very difficult to be performed without modification of the instrument/metrology previously used. In some embodiments, glass-ceramic articles do not present a significant vitreous sodium layer near the surface. In one or more embodiments, a surface concentration of the crystalline phase at the first and second surfaces is within about 1%, or 0.5%, or 0.1% of the crystalline phase in the central composition, as determined by X-ray diffraction (XRD) using a Rietveld analysis. In some embodiments, he glass-ceramic articles herein are stable with respect to color. In one or more embodiments, the articles retain one or more CIELAB color parameters: $a^*$, $b^*$, and $L^*$ to a value of such that a difference before and after wash treatment that is not visually detectable. In one or more embodiments, the wash treatment is 30 minutes or more at a pH in the range of ~2 to ~12. In one or more embodiments, $L^*$ is ±1 unit or less, ±0.75 units or less, ±0.5 units or less, ±0.25 units or less. In one or more embodiments, $a^*$ is ±0.05 unit or less, ±0.04 units or less, ±0.03 units or less, ±0.2 units or less, ±0.1 units or less. In one or more embodiments, $b^*$ is ±0.5 or less, ±0.45 or less, ±0.4 or less, ±0.35 or less, ±0.3 or less, ±0.25 or less, ±0.20 or less, ±0.15 or less, ±0.1 or less, or ±0.05 or less. The color parameters are also stable over various pH values ranging from 2 to 12 relative to an unwashed article.

The techniques can be used in any lithium-based glass-ceramic substrate. Other elements not contained in the substrate, in addition to potassium (K), such as rubidium (Rb), cesium (Cs), francium (Fr), silver (Ag), gold (Au), copper (Cu), and combinations thereof can also be introduced using the same technique.

A depth of compression (DOC) may be in a range from greater than 0*t to 0.3*t, greater than 0*t to 0.25*t, greater than 0*t to 0.2*t, 0.05*t to 0.3*t, 0.05*t to 0.25*t, 0.05*t to 0.2*t, 0.1*t to 0.3*t, 0.1*t to 0.25*t, 0.1*t to 0.2*t, 0.15*t to 0.3*t, 0.15*t to 0.25*t, 0.15*t to 0.2*t, 0.17*t to 0.3*t, 0.17*t to 0.25*t, 0.17*t to 0.2*t, 0.18*t to 0.3*t, 0.18*t to 0.25*t, and all ranges and subranges therebetween wherein t is the thickness of the glass ceramic article. In some embodiments, the DOC may be greater than or equal to 0.1·t, 0.11·t, 0.12·t, 0.13·t, 0.14·t, 0.15·t, 0.16·t, 0.17·t, or 0.175·t, or 0.18·t, 0.188·t, or deeper.

A depth of layer (DOL) with respect to potassium may be greater than or equal to 0.01·t, or greater, 0.02·t, or greater, 0.03·t, or greater, 0.04·t, or greater, or 0.05·t, or greater.

In one or more embodiments, all points of the stress profile located in the spike region comprise a tangent having an absolute value that is 20 MPa/micrometer or greater. In one or more embodiments, the spike region comprises a compressive stress of 200 MPa or more from at least the first surface to a depth of 3 micrometers or more.

In one or more embodiments, all points of the stress profile located in the tail region comprise a tangent having an absolute value that is 2 MPa/micrometer or less.

A surface compressive stress (CS) at the first surface may be 200 MPa or greater. CS may be in the range of 200 MPa to 1.2 GPa, 400 MPa to 950 MPa, or about 800 MPa, and all values and subranges therebetween. In one or more embodiments, a first compressive stress at from about 5 micrometers to 10 micrometers depth from the first surface is 200 MPa or more.

A maximum central tension (CT) may be 30 MPa or greater, 40 MPa or greater, 45 MPa or greater, or 50 MPa or greater. CT may be in the range of 30 MPa to 100 MPa, and all values and subranges therebetween.

In some embodiments, the glass-ceramic article has a thickness t in a range from 0.2 mm to 5 mm, 0.2 mm to 4 mm, 0.2 mm to 3 mm, 0.2 mm to 2 mm, 0.2 mm to 1.5 mm, 0.2 mm to 1 mm, 0.2 mm to 0.9 mm, 0.2 mm to 0.8 mm, 0.2 mm to 0.7 mm, 0.2 mm to 0.6 mm, 0.2 mm to 0.5 mm, 0.3 mm to 5 mm, 0.3 mm to 4 mm, 0.3 mm to 3 mm, 0.3 mm to 2 mm, 0.3 mm to 1.5 mm, 0.3 mm to 1 mm, 0.3 mm to 0.9 mm, 0.3 mm to 0.8 mm, 0.3 mm to 0.7 mm, 0.3 mm to 0.6 mm, 0.3 mm to 0.5 mm, 0.4 mm to 5 mm, 0.4 mm to 4 mm, 0.4 mm to 3 mm, 0.4 mm to 2 mm, 0.4 mm to 1.5 mm, 0.4 mm to 1 mm, 0.4 mm to 0.9 mm, 0.4 mm to 0.8 mm, 0.4 mm to 0.7 mm, 0.4 mm to 0.6 mm, 0.5 mm to 5 mm, 0.5 mm to 4 mm, 0.5 mm to 3 mm, 0.5 mm to 2 mm, 0.5 mm to 1.5 mm, 0.5 mm to 1 mm, 0.5 mm to 0.9 mm, 0.5 mm to 0.8 mm, 0.5 mm to 0.7 mm, 0.8 mm to 5 mm, 0.8 mm to 4 mm, 0.8 mm to 3 mm, 0.8 mm to 2 mm, 0.8 mm to 1.5 mm, 0.8 mm to 1 mm, 1 mm to 2 mm, 1 mm to 1.5 mm, and all ranges and subranges therebetween. In some embodiments, the glass-ceramic article may be substantially planar and flat. In other embodiments, the glass-ceramic article may be shaped, for example it may have a 2.5D or 3D shape. In some embodiments, the glass-ceramic article may have a uniform thickness and in other embodiments, the glass-ceramic article may not have a uniform thickness.

Glass-Ceramic Substrates

In one or more embodiments, the glass-ceramic substrates have a thickness t in the range of from 200 micrometers to 5 millimeters, and all values and subranges therebetween.

Glass-ceramic substrates may be provided using a variety of different processes. The processes for making the glass ceramic includes heat treating the precursor glasses at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In some embodiments, the heat treatment can include (i) heating precursor glasses at a rate of 1-10° C./min to a glass pre-nucleation temperature: (ii) maintaining the crystallizable glasses at the glass pre-nucleation temperature for a time in a range from about ¼ hr to about 4 hr to produce pre-nucleated crystallizable glasses; (iii) heating the pre-nucleated crystallizable glasses at a rate of 1-10° C./min to nucleation temperature (Tn); (iv) maintaining the crystallizable glasses at the nucleation temperature for a time in the range from between about ¼ hr to about 4 hr to produce nucleated crystallizable glasses; (v) heating the nucleated crystallizable glasses at a rate in the range from about 1° C./min to about 10° C./min to a crystallization temperature (Tc); (vi) maintaining the nucleated crystallizable glasses at the crystallization temperature for a time in the range from about ¼ hr to about 4 hr to produce the glass ceramic described herein; and (vii) cooling the formed glass ceramic to room temperature. As used herein, the term crystallization temperature may be used interchangeably with ceram or ceramming temperature. In addition, the terms "ceram" or "ceramming" in these embodiments, may be used to refer to steps (v), (vi) and optionally (vii), collectively. In some embodiments, the glass pre-nucleation temperature can be 540° C., the nucleation temperature can be 600° C., and the crystallization temperature can be in a range from 630° C. to 730° C. In other embodiments, the heat treatment does not include maintaining the crystallizable glasses at a glass pre-nucleation temperature. Thus the heat treatment may include (i) heating precursor glasses at a rate of 1-10° C./min to a nucleation temperature (Tn); (ii) maintaining the crystallizable glasses at the nucleation temperature for a time in the range from between about ¼ hr to about 4 hr to produce nucleated crystallizable glasses; (iii) heating the nucleated crystallizable glasses at a rate in the range from about 1° C./min to about 10° C./min to a crystallization temperature (Tc); (iv) maintaining the nucleated crystallizable glasses at the crystallization temperature for a time in the range from about ¼ hr to about 4 hr to produce the glass ceramic described herein; and (v) cooling the formed glass ceramic to room temperature. The terms "ceram" or "ceramming", in the preceding embodiments, may be used to refer to steps (iii), (iv) and optionally (v), collectively. In some embodiments, the nucleation temperature can be about 700° C., and the crystallization temperature can be about 800° C. In some embodiments, the higher the crystallization temperature, the more β-spodumene ss is produced as a minor crystalline phase.

Temperature-temporal profile of heat treatment steps of heating to the crystallization temperature and maintaining the temperature at the crystallization temperature in addition to precursor glass compositions, are judiciously prescribed so as to produce one or more of the following desired attributes: crystalline phase(s) of the glass ceramic, proportions of one or more major crystalline phases and/or one or more minor crystalline phases and residual glass, crystal phase assemblages of one or more predominate crystalline phases and/or one or more minor crystalline phases and residual glass, and grain sizes or grain size distributions among one or more major crystalline phases and/or one or more minor crystalline phases, which in turn may influence the final integrity, quality, color, and/or opacity, of resultant formed glass ceramic.

The resultant glass ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously.

In yet other embodiments, the precursor glass compositions used to form the glass-ceramic can be formulated, for example, so that the glass-ceramic is capable of being chemically strengthened using one or more ion exchange techniques. In these embodiments, ion exchange can occur by subjecting one or more surfaces of such glass-ceramic to one or more ion exchange baths, having a specific composition and temperature, for a specified time period to impart to the one or more surfaces with compressive stress layer(s). The compressive stress layer can include one or more average surface compressive stress (CS), and/or one or more depths of layer.

The precursor glasses and glass-ceramics described herein may be generically described as lithium-containing aluminosilicate glasses or glass-ceramics and comprise $SiO_2$, $Al_2O_3$, and $Li_2O$ in their base compositions. In addition to $SiO_2$, $Al_2O_3$, and $Li_2O$, the glasses and glass-ceramics embodied herein may further contain alkali salts, such as $Na_2O$, $K_2O$, $Rb_2O$, or $Cs_2O$, as well as $P_2O_5$, and $ZrO_2$ and a number of other components as described below. In some embodiments, the precursor glass (before ceramming) and/or the glass-ceramic (after ceramming) may have the following composition in weight percentage on an oxide basis:

$SiO_2$: 55-80%;
$Al_2O_3$: 2-20%;
$Li_2O$: 5-20%;
$B_2O_3$: 0-10%;
$Na_2O$: 0-5%;
$ZnO$: 0-10%;
$P_2O_5$: 0.5-6%; and
$ZrO_2$: 0.2-15%.

In some embodiments, the precursor glass and/or the glass-ceramic has a composition further comprising the following optional additional components in weight percentage on an oxide basis:

$K_2O$: 0-4%;
$MgO$: 0-8%;
$TiO_2$: 0-5%;
$CeO_2$: 0-0.4% and
$SnO_2$: 0.05-0.5%.

Upon performing the above heat treatments to the precursor glass, the resultant glass-ceramic has one or more crystalline phases and a residual glass phase. In some embodiments, the glass-ceramic contains the following exemplary crystalline phases: lithium silicate (including lithium disilicate), petalite, β-spodumene solid solution, β-quartz solid solution, and any combinations thereof. In some embodiments there may be a mixture of lithium disilicate, petalite, and β-quartz solid solution crystalline phases. In other embodiments, there may be a mixture of lithium disilicate and petalite crystalline phases. In yet other embodiments, there may be a mixture of lithium disilicate and β-spodumene solid solution crystalline phases. In still other embodiments, there may be a mixture of lithium disilicate, β-spodumene solid solution, and β-quartz solid solution crystalline phases. In some embodiments, lithium disilicate is the crystalline phase with the highest weight percentage. In some embodiments petalite is the crystalline phase with the highest weight percentage. In some embodiments, β-spodumene ss is the crystalline phase with the highest weight percentage. In some embodiments, β-quartz ss is the crystalline phase with the highest weight percentage In some embodiments, the glass-ceramic has a residual glass content of about 5 to about 30 wt %, about 5 to about 25 wt %, about 5 to about 20 wt %, about 5 to about 15 wt % about 5 to about 10 wt %, about 10 to about 30 wt %, about 10 to about 25 wt %, about 10 to about 20 wt %, about 10 to about 15 wt %, about 15 to about 30 wt %, about 15 to about 25 wt %, about 15 to about 20 wt %, about 20 to about 30 wt % about 20 to about 25 wt %, about 25 to about 30 wt %, and all ranges and subranges therebetween. In some embodiments the residual glass content can be 5, 6, 7, 8, 9, 10, 11, 12, 13, 14, 15, 16, 17, 18, 19, 20, 21, 22, 23, 24, 25, 26, 27, 28, 29, or 30 wt %. In some embodiments, the inner region may have a weight percentage of crystals in a range from greater than 20 wt % to 100 wt %, greater than 20 wt % to 90 wt %, greater than 20 wt % to 80 wt %, greater than 20 wt % to 70 wt %, 30 wt % to 100 wt %, 30 wt % to 90 wt %, 30 wt % to 80 wt %, 30 wt % to 70 wt %, 40 wt % to 100 wt %, 40 wt % to 90 wt %, 40 wt % to 80 wt %, 40 wt % to 70 wt %, 50 wt % to 100 wt %, 50 wt % to 90 wt %, 50 wt % to 80 wt %, 50 wt % to 70 wt %, and all ranges and subranges therebetween. In some embodiments, the inner region may have a weight percentage of crystals greater than 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %. The weight percentages are determined based on x-ray diffraction (XRD) using a Rietveld analysis.

End Products

Figure 1B:
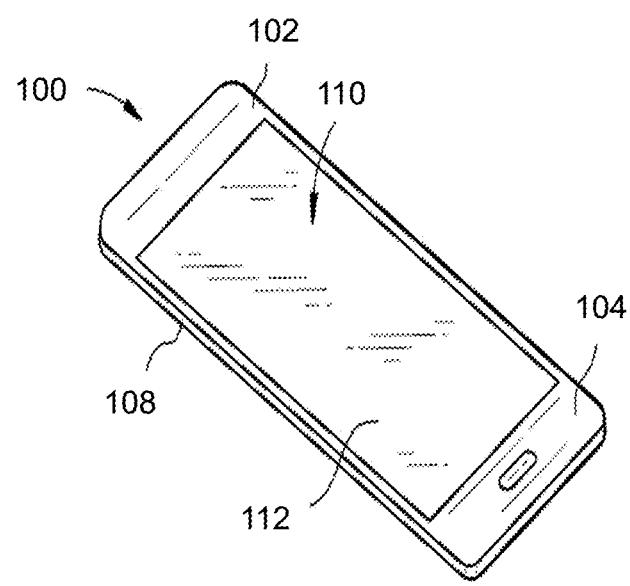
FIG. 1B is a perspective view of the exemplary electronic device of FIG. 1A.

The glass-ceramic articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc. for example for use an interior display cover, a window, or windshield), appliance articles, or any article that requires some transparency, scratch-resistance, abrasion resistance or a combination thereof. An exemplary article incorporating any of the glass-ceramic articles disclosed herein is shown in FIGS. 1A and 1B. Specifically, FIGS. 1A and 1B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, at least one of the cover substrate 112 or a portion of housing 102 may include any of the glass-ceramic strengthened articles disclosed herein.

EXAMPLES

Various embodiments will be further clarified by the following examples. In the Examples, prior to strengthening, the Examples are referred to as "substrates". After being subjected to strengthening, the Examples are referred to as "articles" or "glass-ceramic articles".

Examples are based on glass-ceramic substrate prepared in the following manner. A precursor glass having an approximate composition of 73.47 wt % $SiO_2$, 7.51 wt % $Al_2O_3$, 2.14 wt % $P_2O_5$, 11.10 wt % $Li_2O$, 1.63 wt % $Na_2O$, 3.55 wt % $ZrO_2$, 0.22 wt % $SnO_2$ was subjected to a ceram schedule of heating to 560° C. and holding at that temperature for 4 hours, then heating to 720° C. and holding at that temperature for 1 hour. The resulting glass-ceramic was 14 wt % residual glass, 46 wt % lithium disilicate crystalline phase, 39 wt % petalite crystalline phase, and approximately 1 wt % minor crystalline phases. The substrates tested herein had a thickness of 800 micrometers.

Example 1

A glass-ceramic article was formed from the above-referenced lithium-based glass-ceramic substrate by a two-step ion exchange treatment.

Figure 2:
FIG. 2 is an image of TM and TE guided mode spectra fringes of a glass-ceramic article after a first IOX treatment.

A first IOX bath was 100 wt % $KNO_3$, and a dosage of 0.5 wt % $NaNO_2$ (of the bath) was added to the bath for improving bath chemistry. IOX was at 460° C. for 8 hours. After the first IOX, there was a 0.1824% weight gain, a compressive stress (CS) of 435 MPa, a depth of layer (DOL) with respect to K of 8.1 micrometers (the depth of the knee), a maximum central tension (CT) of 25.60 MPa. FIG. 2 is an image of TM and TE guided mode spectra fringes after the first IOX treatment.

Figure 3:
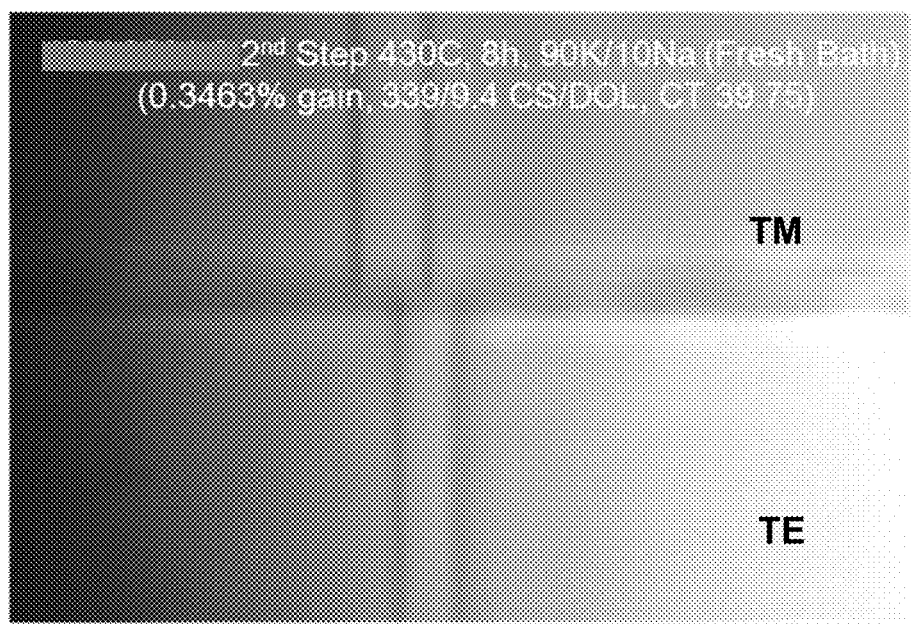
FIG. 3 is an image of TM and TE guided mode spectra fringes of a glass-ceramic article according to an embodiment after a second IOX treatment.

The substrate was then exposed to a second IOX bath that was 90 wt % KNO$_3$ and 10 wt % NaNO$_3$, and included a dosage of 0.5 wt % NaNO$_2$ (of the bath). The second IOX was at 430° C. for 8 hours. There was a 0.3463% weight gain, a CS of 339 MPa, a DOL with respect to K of 9.4 micrometers, a maximum central tension (CT) of 39.75 MPa. FIG. 3 is an image of TM and TE guided mode spectra fringes of the resulting glass-ceramic article. There is blurriness to the fringes in FIG. 3 caused by a sodium rich layer that formed upon IOX. This sodium rich layer has a lower index than the substrate leading to a reduction of the light coupling. In this example, although the presence of the sodium rich layer can make it difficult to measure the fringes, the fringes are detectable as shown in FIG. 3.

Example 2

A glass-ceramic article was formed from the above-referenced lithium-based glass-ceramic substrate by a two-step ion exchange treatment with lithium present during IOX.

Figure 4:
FIG. 4 is an image of TM and TE guided mode spectra fringes of a glass-ceramic article after a first IOX treatment.

A first IOX bath was 100 wt % KNO$_3$, to which a dosage of 0.02 wt % of LiNO$_3$ and a dosage of 0.5 wt % NaNO$_2$ (of the bath) was added. The first IOX was at 460° C. for 8 hours. There was a 0.1219% weight gain and a CT of 17.36 MPa. FIG. 4 is an image of TM and TE guided mode spectra fringes after the first IOX treatment.

Figure 5:
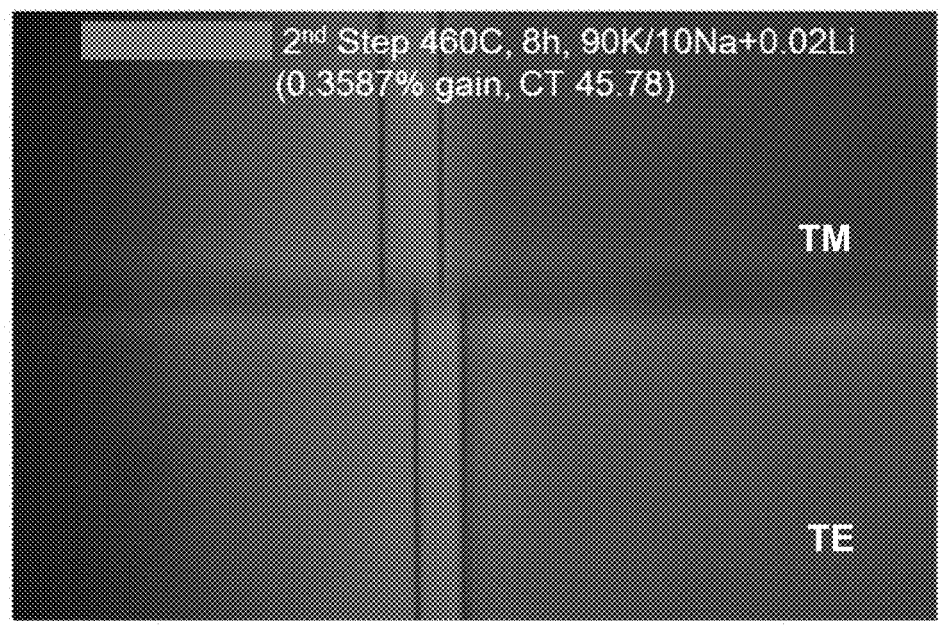
FIG. 5 is an image of TM and TE guided mode spectra fringes of a glass-ceramic article according to an embodiment after a second IOX treatment.

The substrate was then exposed to a second IOX bath that was 90 wt % KNO$_3$ and 10 wt % NaNO$_3$, to which a dosage of 0.02 wt % of LiNO$_3$ and a dosage of 0.5 wt % NaNO$_2$ (of the bath) were added. The second IOX was at 430° C. for 8 hours. There was a 0.3587% weight gain and a CT of 45.78 MPa. FIG. 5 is an image of TM and TE guided mode spectra fringes of the resulting glass-ceramic article. Two fringes are present which allows for proper process control of the bath composition, the temperature of the bath, and the duration of the ion exchange treatments. In this example, including a small amount of LiNO$_3$ in the ion-exchange baths, in particular the second bath, impeded/eliminated the sodium rich layer, which resulted in the fringes in particular after the second step being more clear and crisp reducing variability and allowing a better process control of the bath composition, the temperature of the bath, and the duration of the ion exchange treatments as compared to Example 1.

Example 3

A glass-ceramic article was formed from the above-referenced lithium-based glass-ceramic substrate by a two-step ion exchange treatment with lithium present during IOX.

Figure 7:
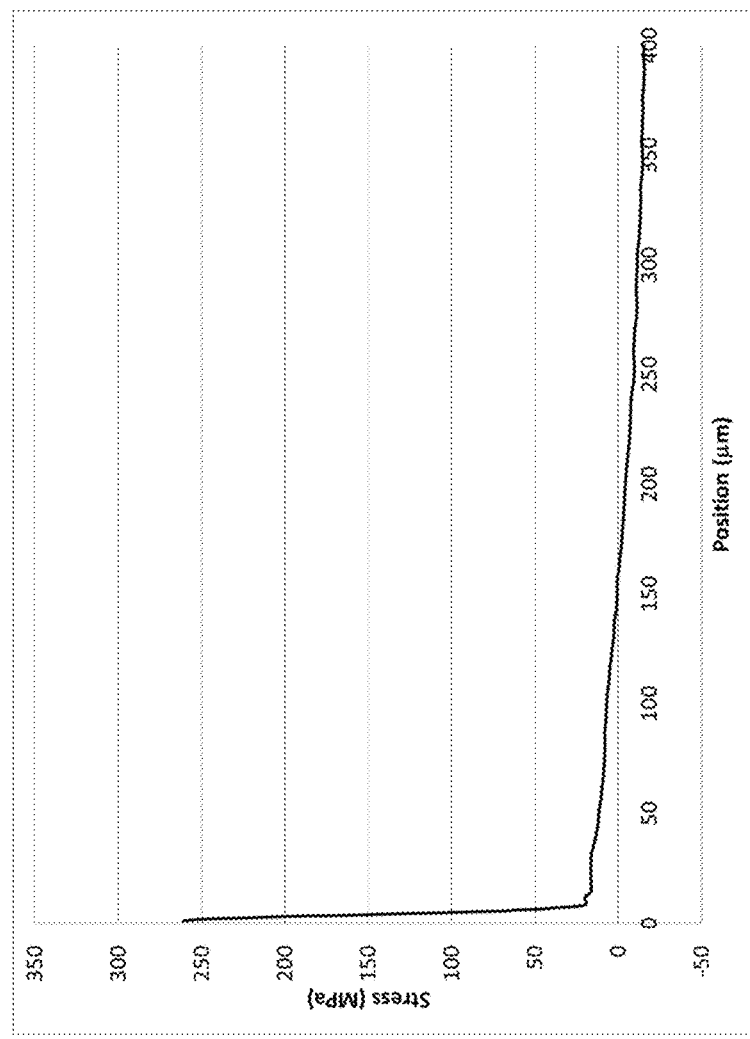
FIG. 7 is a stress profile of stress (MPa) versus position (micrometer) of the glass-ceramic article of FIG. 6 after a first IOX treatment.
Figure 6:
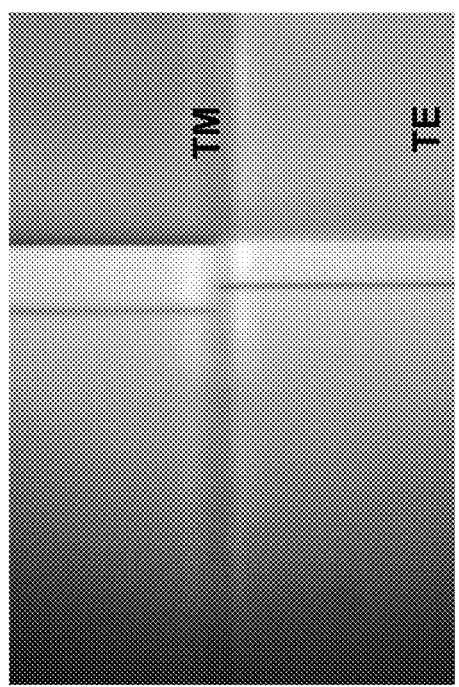
FIG. 6 is an image of TM and TE guided mode spectra fringes of a glass-ceramic article after a first IOX treatment.

A first IOX bath was 100 wt % KNO$_3$, to which a dosage of 0.02 wt % of LiNO$_3$ and a dosage of 0.5 wt % NaNO$_2$ (of the bath) was added. The first IOX was at 460° C. for 8 hours. There was a CT of 15.97 MPa. FIG. 6 is an image of TM and TE guided mode spectra fringes after the first IOX treatment. FIG. 7 is the resulting stress profile after the first IOX treatment (stress (MPa) versus position (micrometer)) for one half of the substrate thickness. In FIG. 7, the presence of the spike is noted.

Figure 8:
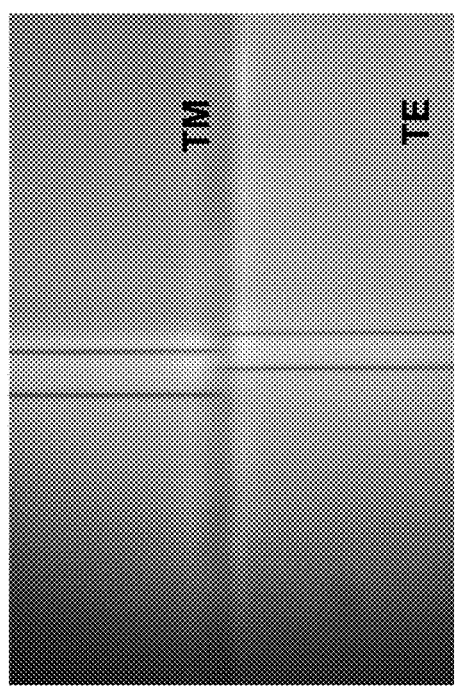
FIG. 8 is an image of TM and TE guided mode spectra fringes of a glass-ceramic article according to an embodiment after double IOX treatment.
Figure 9:
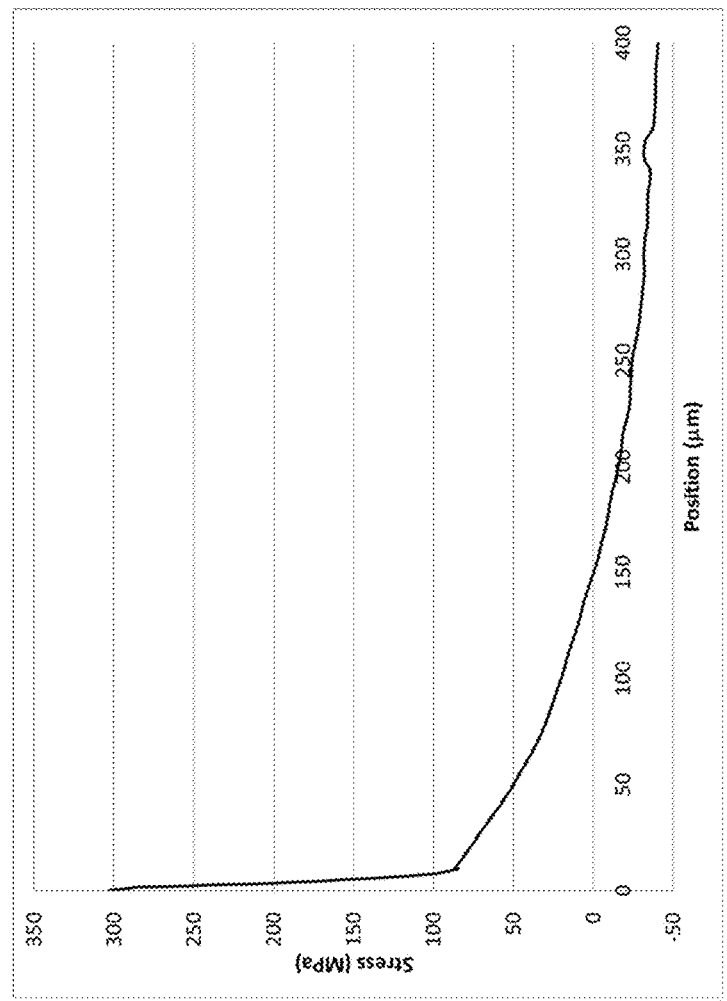
FIG. 9 is a stress profile of stress (MPa) versus position (micrometer) of the glass-ceramic article of FIG. 8 after a double IOX treatment.

The substrate was then exposed to a second IOX bath that was 90 wt % KNO$_3$ and 10 wt % NaNO$_3$, to which a dosage of 0.02 wt % of LiNO$_3$ and a dosage of 0.5 wt % NaNO$_2$ (of the bath) were added. The second IOX was at 460° C. for 10 hours. There was a CS of 303 MPa, a DOL of potassium (the knee depth) of 11.3 micrometers, and a CT of 44.08 MPa. FIG. 8 is an image of TM and TE guided mode spectra fringes of the resulting glass-ceramic article. FIG. 9 is the resulting stress profile after the first IOX treatment (stress (MPa) versus position (micrometer)) for one half of the substrate thickness. The small oscillation at the depth of ~350 micrometers is an artifact of the measurement. One can observe that the measured DOC 150 micrometers (0.1875*t) that is where the stress is zero inside the sample stay approximately the same between the first and second ion exchange treatments. The CS at the knee point where the profile spike and profile tail merge is approximately 85 MPa and greatly increased with respect to the CS at the knee after the first ion exchange treatment (See FIG. 7).

Here the use of time, temperature, and dosing of the baths allowed the formation of a spike after the first IOX, which was followed by the maintenance of the spike and the formation of a tail of stress in the second IOX. Under these conditions a minimum of two fringes was present in each step allowing proper process control of the bath composition, the temperature of the bath, and the duration of the ion exchange treatments.

Example 4

A glass-ceramic article was formed from the above-referenced lithium-based glass-ceramic substrate by a two-step ion exchange treatment with lithium present during IOX.

Figure 10:
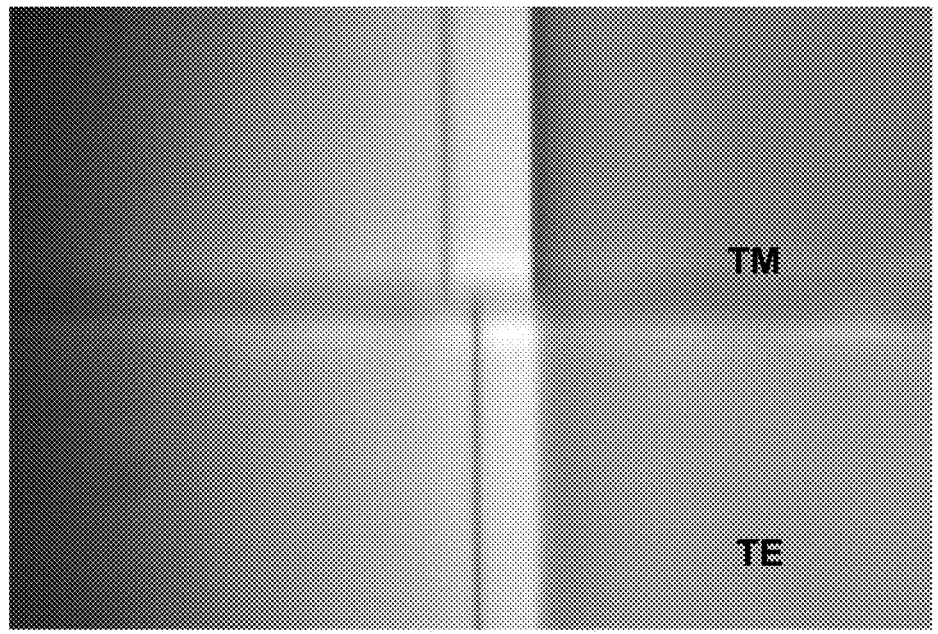
FIG. 10 is an image of TM and TE guided mode spectra fringes of a glass-ceramic article after a first IOX treatment.

A first IOX bath was 100 wt % KNO$_3$, to which a dosage of 0.15 wt % of LiNO$_3$, a dosage of 0.5 wt % NaNO$_2$, and a dosage of 0.2 wt % TSP (tri-sodium phosphate) (of the bath) was added. The first IOX was at 460° C. for 8 hours. There was a CT of 12.32 MPa. FIG. 10 is an image of TM and TE guided mode spectra fringes after the first IOX treatment.

Figure 11:
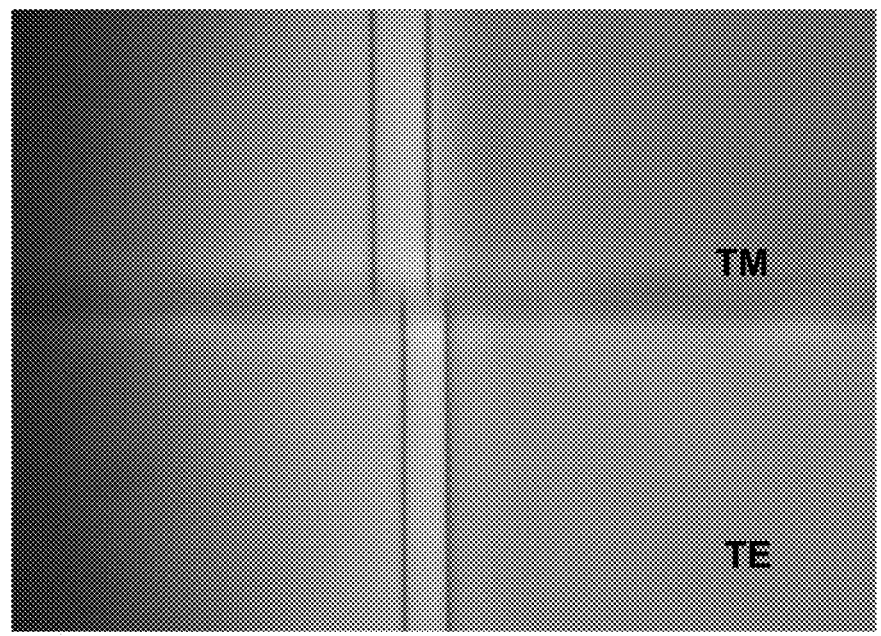
FIG. 11 is an image of TM and TE guided mode spectra fringes of a glass-ceramic article after a second IOX treatment.

The substrate was then exposed to a second IOX bath that was 90 wt % KNO$_3$ and 10 wt % NaNO$_3$, to which a dosage of 0.15 wt % of LiNO$_3$, a dosage of 0.5 wt % NaNO$_2$, and a dosage of 0.2 wt % TSP (of the bath) were added. The second IOX was at 460° C. for 10 hours. There was a CS of 276 MPa, a DOL of 11.2 micrometers, and a CT of 42.36 MPa. FIG. 11 is an image of TM and TE guided mode spectra fringes of the resulting glass-ceramic article.

Here, use of 0.15 wt % LiNO$_3$ is to approximate end of life to an IOX tank based on a poisoning level tolerated commercially prior to the cleaning and start of a new fresh tank or to the use of additional chemistry to reduce and precipitate the amount of Li. One way to precipitate lithium is to use tri-sodium phosphate (TSP) added to the tank. In this example, a reduction in surface stress is present (relative to Example 3) but the process after the second step still present clear fringes allowing the measurements and process control after the second step. The use of appropriated time, temperature and dosing of the baths allowed formation of a spike after the first IOX, which was followed by the maintenance of the spike and the formation of a tail of stress in the second IOX. Under these conditions a minimum of two fringes are present in each step allowing proper process control of the bath composition, the temperature of the bath, and the duration of the ion exchange treatments.

Example 5

A series of glass-ceramic articles were formed from the above-referenced lithium-based glass-ceramic substrate by a two-step ion exchange treatment with lithium present during IOX. The substrates were exposed to: a first IOX bath was (100−x) wt % KNO$_3$ and x wt % of LiNO$_3$ at 460° C. for 8 hours; and a second IOX bath was 90 wt % KNO$_3$+(10–x) wt % NaNO$_3$+x wt % LiNO$_3$ at 430° C. for 8 hours.

Figure 12:
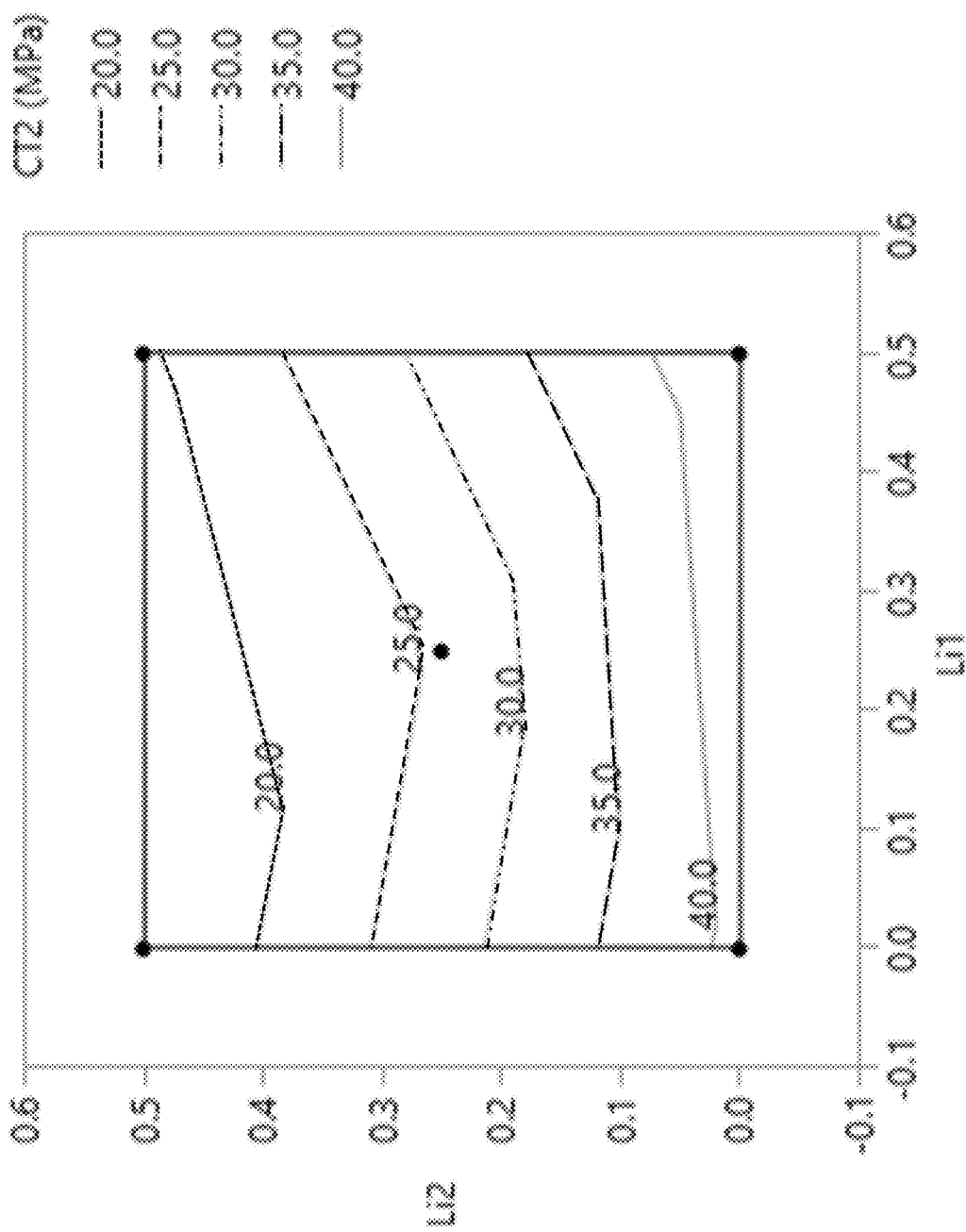
FIG. 12 is a graph of lithium concentration of a second IOX bath versus a first IOX bath and contour lines of central tension (CT)

This example sets forth a relation of dosage level with respect to each of the first and second IOX baths on CT. For varying values of "x", CT was measured and FIG. 12 provides the results. With this treatment, even at a reduced second step temperature of 430° C., the poison amount of first IOX seems to contribute very little to the overall CT of the final article. The stress profile varies faster with the dosing of Li in the second IOX. Most of the changes in CT occur due to the poison level of lithium in the second IOX. In a preferred embodiment, a lithium content of each IOX bath is up to 0.2 wt % Li in order to keep the CT values >30 MPa.

For example, a second IOX bath comprised: 90 wt % KNO$_3$, 9.3 wt % NaNO$_3$, and 0.7 wt % LiNO$_3$, to which a dosage of 0.5 wt % NaNO$_2$ (based on the bath) was added. Temperature of the bath was 460° C. To this, 1.2 wt % TSP (of the bath) was added to the bath to precipitate LiNO$_3$. Reaction (I) represents this chemistry:

2LiNO$_3$ (l)+Na$_3$PO$_4$ (s)↔NaLi$_2$PO$_4$ (s)+2NaNO$_3$ (l)  (I).

100% conversion theoretically would allow 1.2 wt % TSP to completely precipitate the LiNO$_3$ in the bath. Practically, about 0.16 wt % of LiNO$_3$ was still in the molten salt bath after 24 hours of TSP addition (0.54 wt % of LiNO$_3$ were precipitated). Without intending to be bound by theory, this is because the complete reaction will take over 24 hours to complete, and reaction equilibrium typically keeps some lithium in molten state. In general, addition of TSP can keep bath lithium nitrate concentration to be less than 0.05 wt %.

Overall, embodiments of two-step IOX treatments disclosed herein, which start with the formation of a large spike in a first IOX and include a second IOX with the presence of sodium and lithium "poisoning" (or dosage) lead to stable bath chemistries and repeatable surface structure. The net result is a process that is controllable, which is expected to result in articles with high impact resistance for drop tests.

Example 6

Figure 13:
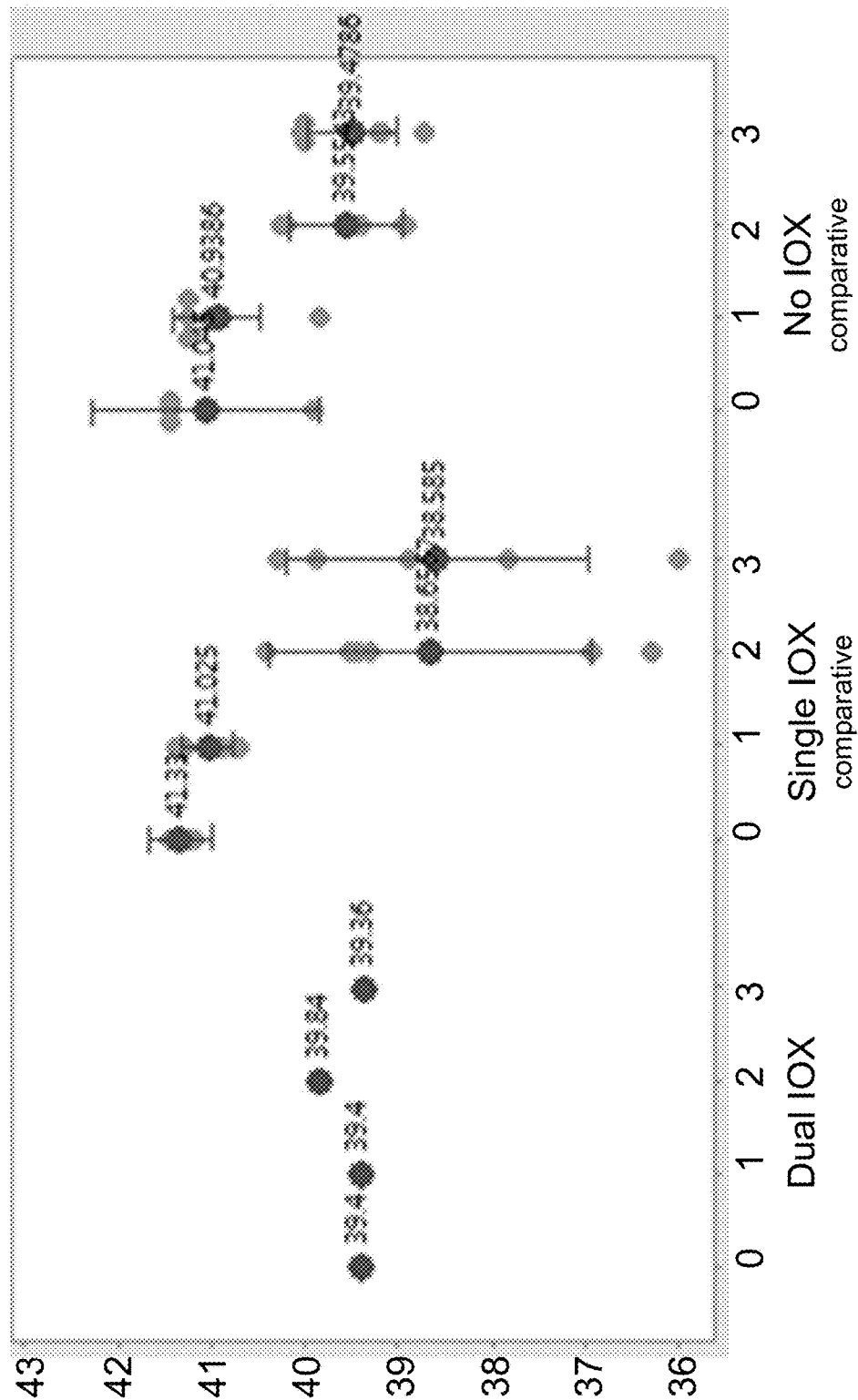
FIG. 13 is a plot of color measurements based on CIELAB color coordinate system showing variability of the L* parameter for various types of treatment.
Figure 14:
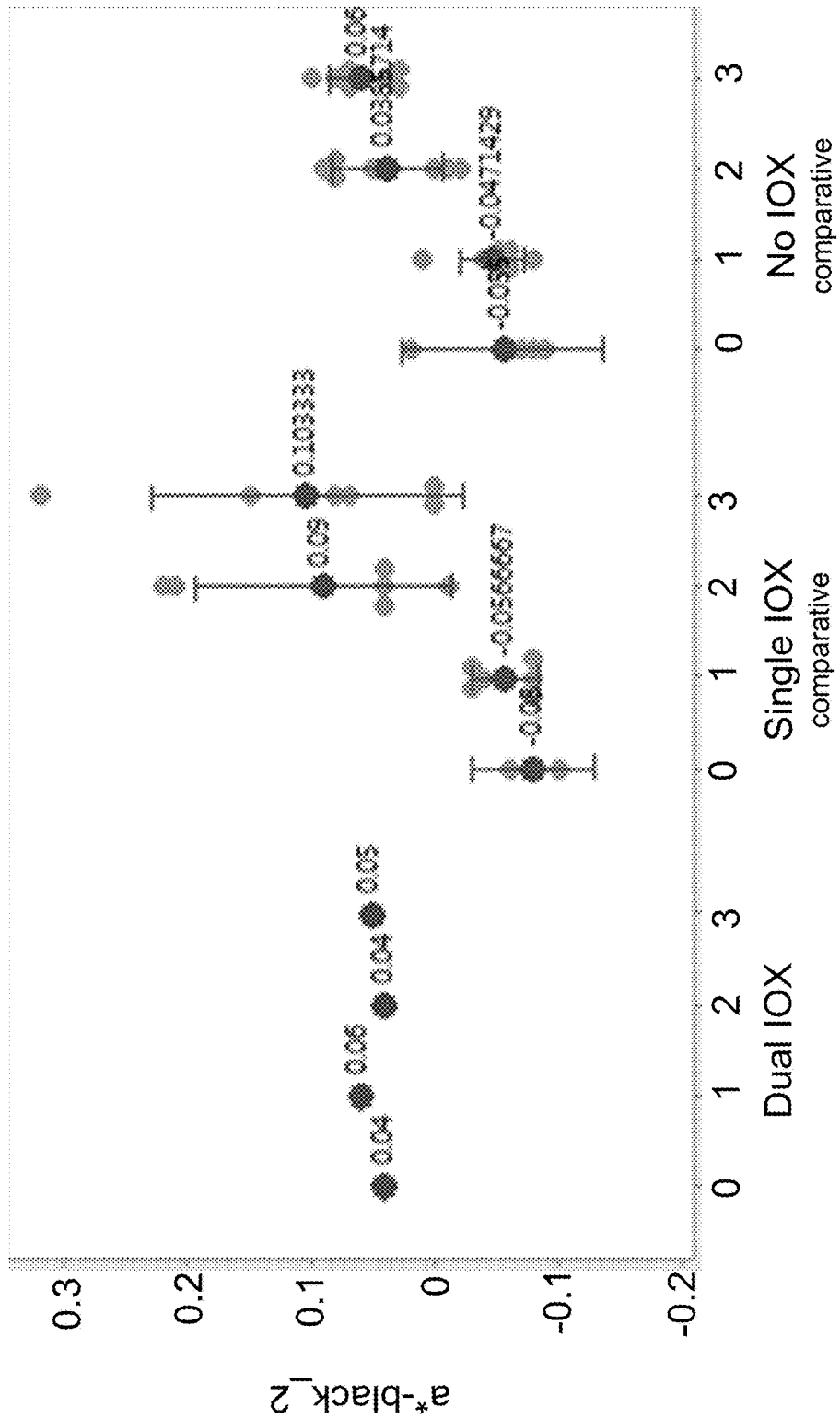
FIG. 14 is a plot of color measurements based on CIELAB color coordinate system showing variability of the a* parameter for various types of treatment.
Figure 15:
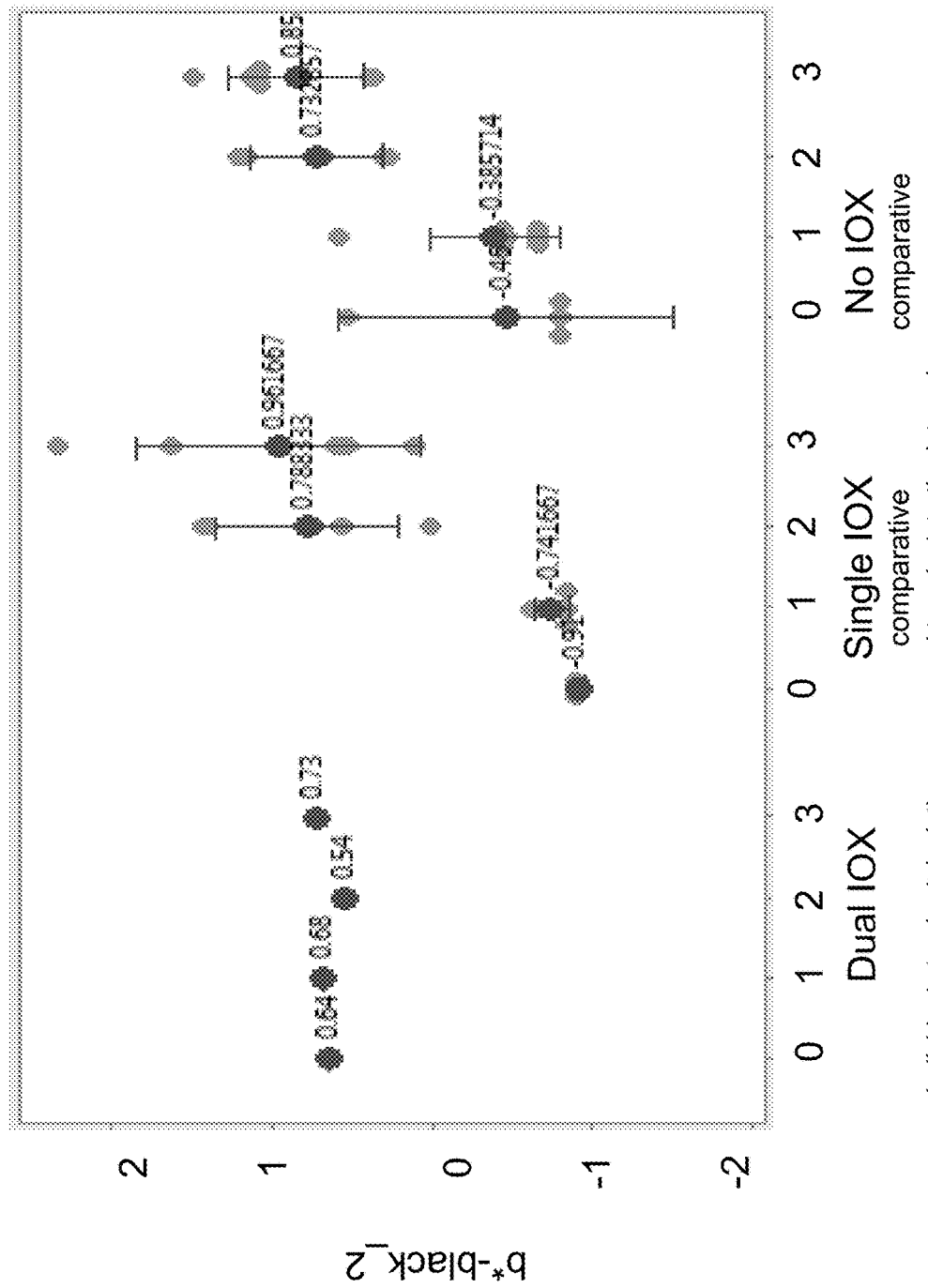
FIG. 15 is a plot of color measurements based on CIELAB color coordinate system showing variability of the b* parameter for various types of treatment.

A series of glass-ceramic articles were formed from the above-referenced lithium-based glass-ceramic substrate by various treatments including: Dual IOX, Single IOX (comparative), and no IOX (comparative). Color stability after wash treatment was determined based on measurements according to CIELAB color coordinate system showing variability of the L* parameter, which is shown in FIG. 13; a* parameter, which is shown in FIG. 14; and b* parameter, which is shown in FIG. 15. In the figures, "0" refers to a measurement prior to any washing, "1" refers to measurement after a first wash/rinse cycle of 30 minutes (15 minutes wash and 15 minutes rinse); "2" refers to a measurement after a second wash/rinse cycle of 30 minutes (15 minutes wash and 15 minutes rinse); "3" refers to a measurement after a third wash/rinse cycle of 30 minutes (15 minutes wash and 15 minutes rinse). The wash cycle (15 minutes) included Semiclean KG in DI water, pH was ~11, in ultrasonic bath at 55° C. The rinse cycle (15 minutes) included DI water in ultrasonic bath at 40 kHz at 55° C. The mean measurements are reported in FIGS. 13-15 and are based on a 95% confidence interval (95% CI) of the mean.

Dual IOX (DIOX): a first IOX bath was 100 wt % KNO$_3$ to which dosages of 0.02 wt % of LiNO$_3$ and 0.5 wt % NaNO$_2$ were added (of the bath) at 460° C. for 8 hours; and a second IOX bath was 90 wt % KNO$_3$+10 wt % NaNO$_3$ to which dosages of 0.02 wt % of LiNO$_3$ and 0.5 wt % NaNO$_2$ were added (of the bath) at 460° C. for 10 hours.

Single IOX (SIOX): an IOX bath was 100 wt % NaNO$_3$ at 470° C. for 4.5 hours.

No IOX: no exposure to any IOX baths.

For the K-spiked DIOX samples, the color parameters a*, b*, and L* after multiple water wash cycles (3 tested) were more stable than the SIOX or no IOX.

Analogous wash/rinse experiments were conducted over a range of pHs from ~2 to ~12. The trends of the color parameters a*, b*, and L* after multiple water wash cycles at varying pH were consistent with FIGS. 13-15 for pH of ~11.

In practice, therefore, the wash solution can be acidic or basic or neutral or non-water-based depending on the chemistry used for cleaning and it is expected that the color of the articles herein would be able to remain stable in the presence of such cleaning solutions.

While the foregoing is directed to various embodiments, other and further embodiments of the disclosure may be devised without departing from the basic scope thereof, and the scope thereof is determined by the claims that follow.

What is claimed is:

1. A glass-ceramic article comprising:
   a glass-ceramic substrate having opposing first and second surfaces defining a substrate thickness (t);
   a central composition at a center of the glass-ceramic article containing an alkali metal and a crystalline phase, wherein the crystalline phase is 20% or more by weight of the central composition; and one or more of:
   (a) a stress profile comprising: a knee that is at a depth of 3 micrometers or more;
   (b) a stress profile comprising: a first compressive stress at the first surface that is 200 MPa or more; and a second compressive stress at a knee that is 20 MPa or more; or
   (c) a non-sodium oxide having a non-zero concentration that varies from the first surface to a depth of layer of the non-sodium oxide; and a stress profile comprising a knee and a depth of compression (DOC) that is located at 0.10·t or deeper; and
   wherein a vitreous surface layer is absent from the glass-ceramic article.

2. The glass-ceramic article of claim 1, wherein the alkali metal of the central composition is lithium.

3. The glass-ceramic article of claim 1, wherein a surface concentration of the crystalline phase at the first and second surfaces is within about 1% of the crystalline phase in the central composition.

4. The glass-ceramic article of claim 1, wherein the crystalline phase comprises a petalite crystalline phase and/or a lithium silicate crystalline phase, wherein the lithium silicate crystalline phase is a lithium disilicate crystalline phase.

5. The glass-ceramic article of claim 1, wherein the glass-ceramic substrate comprises lithium-containing aluminosilicate glass-ceramic with a β-spodumene solid solution crystalline phase.

6. The glass-ceramic article of claim 1, wherein the central composition comprises by weight: 55 to 80% SiO$_2$, 2 to 20% Al$_2$O$_3$, 0.5 to 6% P$_2$O$_5$, 5 to 20% Li$_2$O, 0 to 5% Na$_2$O, 0.2 to 15% ZrO$_2$, 0 to 10 B$_2$O$_3$; and 0 to 10% ZnO.

7. The glass-ceramic article of claim 1, wherein the stress profile comprises:
   a spike region extending from the first surface to the knee; and a tail region extending from the knee to the center of the glass-ceramic article;

wherein all points of the stress profile located in the spike region comprise a tangent having a value that is 20 MPa/micrometer or greater, and all points of the stress profile located in the tail region comprise a tangent having a value that is 2 MPa/micrometer or less.

8. The glass-ceramic article of claim 1, wherein lithium is present at the first and/or second surfaces in a non-zero concentration.

9. The glass-ceramic article of claim 1, wherein t is in the range of from 50 micrometers to 5 millimeters.

10. The glass-ceramic article of claim 1, wherein at least one of:
   (i) a value of color parameter a* in accordance with CIELAB color coordinate system measured after a wash treatment is within 0.05 units of the color parameter a* prior to exposure to the wash treatment, wherein the wash treatment comprises exposing the glass-ceramic article to a wash solution having a pH from 2 to 12 for 30 minutes;
   (ii) a value of color parameter b* in accordance with CIELAB color coordinate system measured after a wash treatment is within 0.5 units of the color parameter b* prior to exposure to the wash treatment, wherein the wash treatment comprises exposing the glass-ceramic article to a wash solution having a pH from 2 to 12 for 30 minutes; or
   (iii) a value of color parameter L* in accordance with CIELAB color coordinate system measured after a wash treatment is within 1 unit of the color parameter L* prior to exposure to the wash treatment, wherein the wash treatment comprises exposing the glass-ceramic article to a wash solution having a pH from 2 to 12 for 30 minutes.

11. A consumer electronic product comprising:
a housing having a front surface, a back surface, and side surfaces;
electrical components provided at least partially within the housing, the electrical components including at least a controller, a memory, and a display, the display being provided at or adjacent the front surface of the housing; and
a cover disposed over the display;
wherein a portion of at least one of the housing and the cover comprises the glass-ceramic article of claim 1.

* * * * *

UNITED STATES PATENT AND TRADEMARK OFFICE
CERTIFICATE OF CORRECTION

| | | |
|---|---|---|
| PATENT NO. | : 11,401,193 B2 | Page 1 of 1 |
| APPLICATION NO. | : 16/545162 | |
| DATED | : August 2, 2022 | |
| INVENTOR(S) | : Delena Lucinda Justice Duffy et al. | |

It is certified that error appears in the above-identified patent and that said Letters Patent is hereby corrected as shown below:

In the Claims

In Column 20, Line 63, in Claim 6, delete "10" and insert -- 10% --.

Signed and Sealed this
Twentieth Day of December, 2022

Katherine Kelly Vidal
*Director of the United States Patent and Trademark Office*